L. A. CASGRAIN.
MACHINE FOR INSERTING FASTENINGS.
APPLICATION FILED MAY 21, 1910.
1,006,533.
Patented Oct. 24, 1911.
2 SHEETS—SHEET 2.
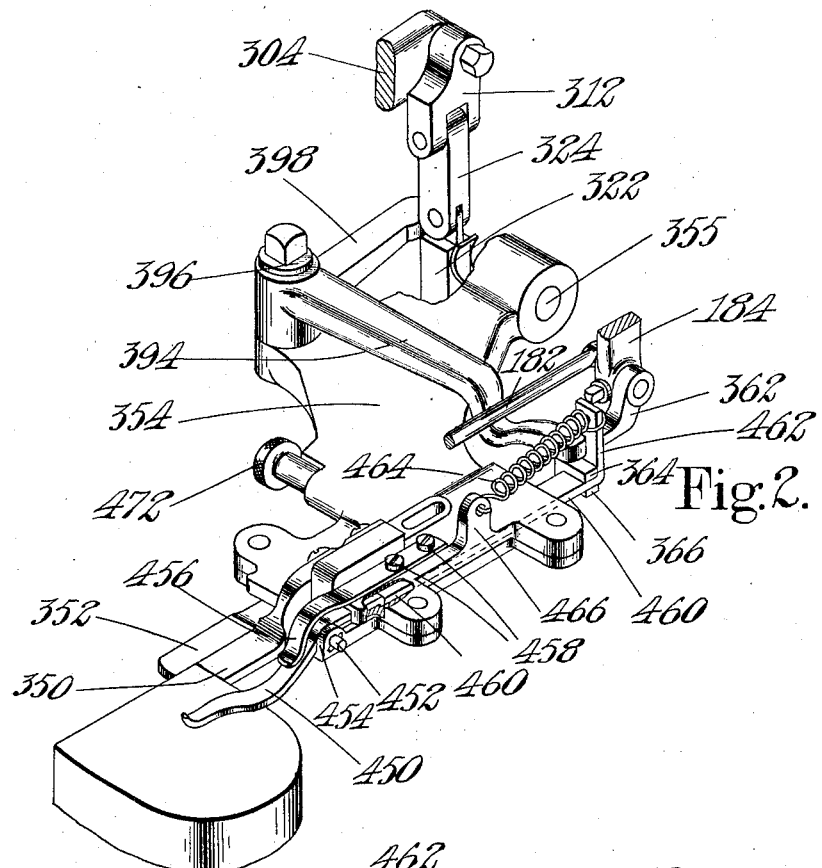
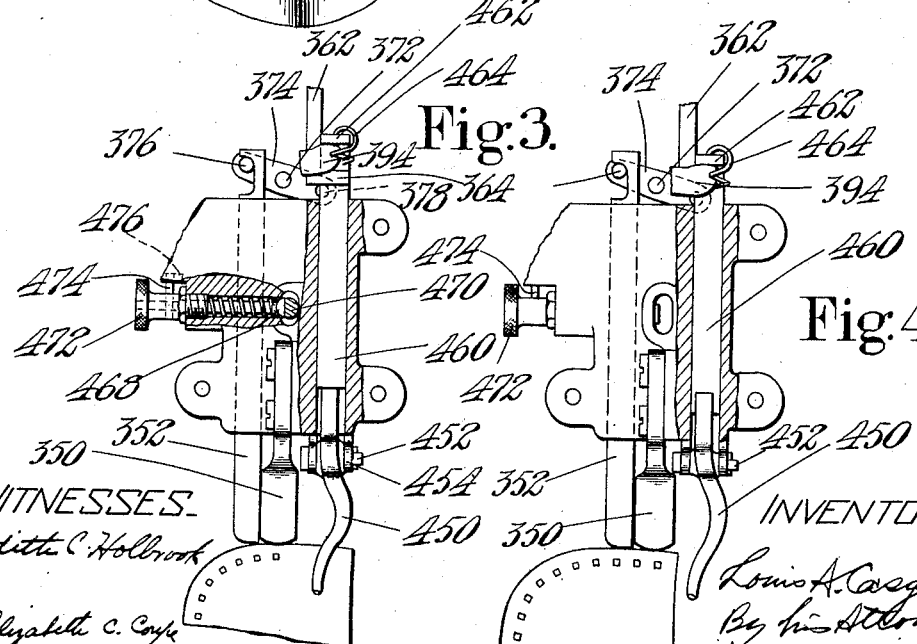

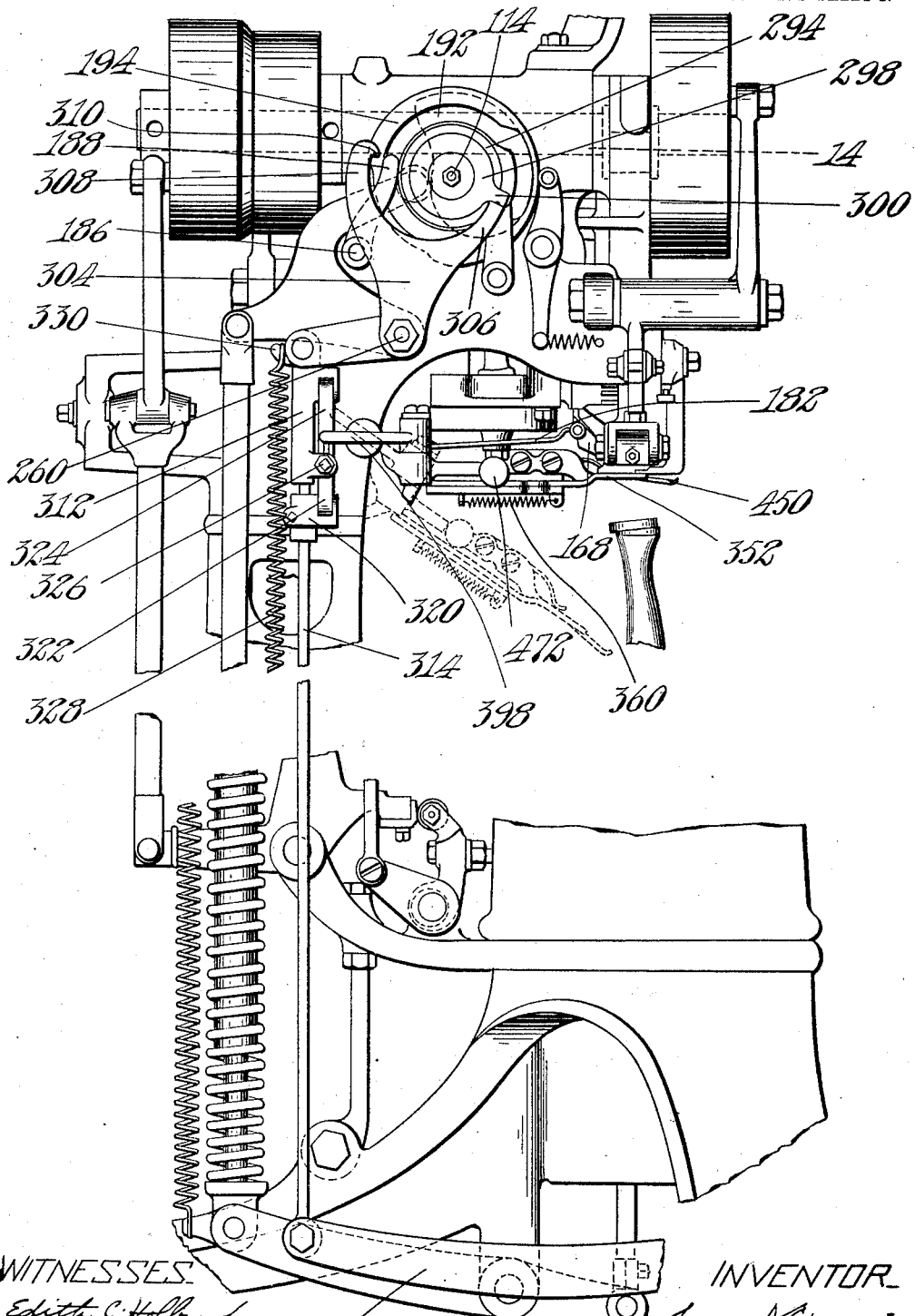

UNITED STATES PATENT OFFICE.

LOUIS A. CASGRAIN, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR INSERTING FASTENINGS.

1,006,533.

Specification of Letters Patent. Patented Oct. 24, 1911.

Application filed May 21, 1910. Serial No. 562,631.

*To all whom it may concern:*

Be it known that I, LOUIS A. CASGRAIN, a citizen of the United States, residing at Beverly, in the county of Essex and State of Massachusetts, have invented certain Improvements in Machines for Inserting Fastenings, of which the following description, in connection with the accompanying drawings, is a specification, like reference characters on the drawings indicating like parts in the several figures.

The present invention relates to machines which perform successive operations at different locations upon work which is moved between the successive operations into different relations thereto and more particularly to machines which successively insert fastenings into work moved past the point of operation of the inserting mechanism.

In the accompanying illustration of a preferred form, the invention is shown as embodied in a fastening inserting machine of the type disclosed in my co-pending application Serial No. 452,755, filed September 12, 1908. It will be understood, however, that many features of the invention are susceptible of wide application.

An object of the invention is to provide improved means for automatically rendering a machine inoperative after a predemined point upon the work has been reached, or after the successive operations of the machine upon the work have produced a desired result.

In the machine of the co-pending application above referred to, the work is supported upon a work support which is movable between a work clamping position and a work releasing position. The work support has also a third position which, for convenience, may be designated a work receiving position. When operating machines of this type the usual practice of the operators is to place the work in proper fastening receiving relation to the inserting mechanism while the work support is in work receiving position and then to cause the work support to be brought into engagement with the opposite side of the work, a gage or gages being usually provided to aid the operator in locating the work. It will be apparent, therefore, that to facilitate the operation of the machine it is important that the initial work positioning operation be comparatively simple. It is therefore important that any mechanism which is controlled from the work in its operation be so positioned that it will not require especial attention on the part of the operator either during the initial work positioning operation or while the machine is operating upon the work.

With the foregoing considerations in view, an object of this invention is to provide improved mechanism for automatically rendering a machine inoperative which will be controlled by the work, preferably by variations in the contour of the work, and which will be so related to the other mechanisms and so positioned in the machine that little attention will be required from the operator either in initially positioning the work to bring it into operative relation to this mechanism or in maintaining the work in such relation to this mechanism as both to prevent its premature operation and to insure its performance of its function at the desired time.

The machine to which the invention is shown as applied is especially adapted for successively inserting fastenings into the heels and soles of boots and shoes. In such work the boot or shoe is usually so guided by an edge gage, or other suitable means, as it moves into the successive fastenings receiving positions, that the fastenings successively inserted will form a row or rows parallel to the edge of the sole or heel. It has been proposed in a prior construction to control also from the edge of the boot or shoe the stopping of the insertion of fastenings, the proposed means being arranged to bear against the edge of the sole or heel, to have movement in the plane of said edge and to be controlled by a particular change in the contour of said edge. Such a construction has been successfully operated. It will be observed, however, that when the controlling edge of the sole or heel is not very thick and is overlapped by other portions of the sole or heel, or of the upper, and when the contour changes considerably at a number of points besides the one at which the actuation of the stopping means is to be effected, a construction of the kind just described will require some attention on the part of the operator, both when initially presenting the work to the machine and also as the work is being fed, since it is important not only that said means be brought into proper relation to the edge when the machine is rendered operative but that it be kept in proper relation to the edge until the part of the edge which, by its change in contour, controls the operation of said means, is brought into operative relation to said means.

According to the present invention, the difficulties encountered in operating prior constructions have been obviated by providing means for effecting automatically the interruption of the operation of the machine which is arranged to be controlled in its operation by that face of the work upon which the machine operates. That part of the said means which engages the work has its operative movement preferably in a plane which intersects the face upon which the machine operates and the operative movement is preferably substantially normal to said face. This arrangement permits the return movement of said means to be effected by the mere presentation of the work to the machine without especial attention on the part of the operator. Moreover the amount of movement of the work engaging member required to render the machine inoperative is great enough so that the release of the work for feeding purposes will not permit such movement, the operation of the automatic stopping means being preferably permitted only when said work engaging member passes over an edge of the face upon which it bears and upon which the machine is operating.

In order that the turning movements of the work, which are necessary to permit the work to be guided by an edge gage into the successive fastening receiving positions, may not cause premature operation of the means for automatically effecting the interruption of the insertion of fastenings, the work engaging member is preferably arranged to bear upon the face which is being operated upon at a point so located with respect to the marginal contour of said face that the angular movements of the work will not cause said means to pass over the edge of the face until the desired operations upon the work have been completed.

In the accompanying drawings which show the invention as especially adapted for use in controlling automatically the operations of a machine for inserting fastenings in the heels of boots or shoes,—

Figure 1 is a broken side elevation of the machine of the co-pending application having applied thereto the present invention; Fig. 2 is a perspective view of the automatic mechanism for controlling the insertion of fastenings; Fig. 3 is a detail plan view, showing the parts in the position in which they are maintained during the successive fastening inserting operations and until the heel has been moved into a position to permit the work engaging member to pass over its breast edge; and Fig. 4 is a detail plan similar to Fig. 3, but showing the heel moved into position to permit the work engaging member to operate to cause the insertion of fastenings to be interrupted.

In the machine of the co-pending application the main shaft 14 is normally kept in motion and a cross shaft 114 is geared to the main shaft so that it is also normally kept in motion. The machine is rendered operative to insert fastenings by connections with a cam disk 194 which is arranged to be clutched to the cross shaft 114 by any suitable clutch mechanism, the illustrated clutch comprising a clutch casing 294 in which a clutch engaging member 298 is arranged to turn to set the clutch, such turning being effected by the action of a spring carried by the clutch casing 294 and bearing against the arm 300 of the clutch engaging member. The cam disk 194 is arranged to rotate in a clockwise direction in Fig. 1 and the spring which bears against the arm 300 tends to turn said arm in the same direction to effect the relative clutch engaging movement of the clutch engaging member 298 and the casing 294. The clutch engaging member 298 is held out of its clutch engaging relation to the clutch casing 294 by means comprising a lever 304 pivoted at 260 upon the machine head and forked at its outer end to embrace the clutch engaging member 298. The fork member 306 of the lever 304 is arranged to engage the arm 300 of the clutch engaging member 298 to hold said member out of the position in which it effects a clutching of the cam disk 194 to the shaft 114, and thus maintains the machine inoperative to insert fastenings. The rotation of the cam disk 194 through an angle of approximately 180° is sufficient to render the machine operative to insert fastenings, and the rotation of said cam disk through a second angle of 180° is sufficient to render the machine inoperative. To permit the rotation of the cam disk to be so controlled that it may be maintained in a position to cause several fastenings to be inserted in succession, the other fork member 308 of the lever 304 is provided with a hook 310 which can be moved by the operator into the path of the arm 300 and thereby cause the clutch engaging member 298 to be turned into clutch releasing position when the cam disk 194 has rotated far enough to render the machine operative.

Means is provided by which the operator can turn the lever 304 to move the fork member 306 out from beneath the arm 300 of the clutch engaging member to permit the cam disk 194 to be clutched to the shaft 114, said means serving at the same time to move the other fork member 308 into position to bring its hook 310 into the path of the arm 300 as the clutch engaging member tends to rotate with the shaft 114. The illustrated means is substantially the same as that disclosed in the co-pending application and comprises a member 312 pivotally connected to the other arm of the lever 304 and provided with a socket in which is received the upper end of a rod 314 connected at its lower end to the rear end of a treadle 316, said treadle being maintained normally in a position to draw the rod 314 down to the lower limit of its movement. A collar 320 clamped upon the rod 314 is connected by a toggle 322, 324 to the member 312. Threaded through an offset portion of the member 312 is a set screw 326 by which the movement of the toggle in the outward direction may be adjustably limited whereby the amount of movement required to break the toggle may be varied. A spring 328 connected at one end to a hook 330 upon the lower arm of the lever 304 and at its other end to the machine frame tends to move the socket in the member 312 down over the rod 314, thus causing the lever 304 to turn about its pivot 260 in a counter-clockwise direction. This relative movement of the member 312 and the rod 314 is normally prevented by the toggle 322, 324 which is normally in its straightened position. The means by which the treadle 316 is maintained normally in a position to draw down the rod 314 to its lowermost limit serves to straighten the toggle after it is broken, this straightening movement being aided, if necessary, by a spring arranged to press the knee joint of the toggle outward, as in the co-pending application above referred to.

From the foregoing description it will be seen that if the forward end of the treadle 316 has been depressed and the rod 314 has been raised when the toggle 322, 324 is in its straightened condition, the lever 304 will be rocked in a clockwise direction about its pivot 260 and the cam disk 194 will be clutched to the shaft 114, to cause the machine to be rendered operative to insert fastenings, the cam disk 194 being again unclutched from the shaft 114 when it has made a half turn. If while the parts are in this position the toggle 322, 324 is broken the spring 328 will draw down the other arm of the lever 304, moving the socket in the member 312 down about the rod 314 and the lever 304 will be rocked in a direction to cause the hook 310 upon the fork member 308 to be moved out of engagement with the arm 300 and the fork member 306 to be moved into the path of rotation of the arm 300, as the cam disk 194 is again clutched to the shaft 114 to render the machine inoperative.

The illustrated means for automatically rendering the machine inoperative to insert fastenings when the work has come into a certain relation to the machine comprises, as in the co-pending application above referred to, means for automatically breaking the toggle 322, 324, and bringing about the sequence of operations just described when the work has been brought into the desired relation to the mechanism for inserting fastenings. In this construction, as also in the construction shown in the co-pending application, the edge gage 350, the end gage 352 and the work engaging member of the automatic stopping means are all carried by a casing or support 354 which is pivoted at 355 to the machine head, whereby these parts may be swung bodily out of operative relation to the inserting mechanism, as shown in dotted lines in Fig. 1.

The work engaging member of the present construction comprises a lever or catch 450 pivoted at 452 to turn about a horizontal axis between ears 454 upstanding from the support or casing 354, the forward arm of said lever being considerably longer than the rear arm and being curved up at its forward end to facilitate the presentation of the work to the machine and the lifting of this end of the lever during such presentation. The forward end of the lever 450 is yieldingly maintained in its lowermost position by a spring 456 attached at its rear end by screws 458 to the support 354 and curved down at its forward end to engage the lever 450 in front of the pivot 452. The movement of the lever 450 about its pivot is sufficient to raise the rear end of said lever out of engagement with the forward end of a slide 460 having an upturned rear end 462 arranged to engage one arm 394 of a bell-crank lever pivoted at 396 upon the support 354 as said slide is pulled forward by a spring 464 connected at one end to the upturned portion 462 of said slide and at its other end to a lug 466 upon the support 354. The movement of the bell-crank about its pivot 396 causes its other arm 398 to engage the toggle 322, 324 in the region of its knee joint, thereby breaking the toggle and causing the insertion of fastenings to be interrupted in the manner hereinabove described. When the machine stops the slide 460 is drawn back into the position shown in Fig. 2 by connection with the means by which the awl carrier 168 is drawn back out of operative relation to the constantly operating fastening inserting mechanism, said means comprising an arm 184 connected to the rock-shaft 186 at one end and at its other end connected by a rod 182 to the awl carrier 168. The arm 184 has also pivotally connected to its lower end a member 362 which has at its forward end two lugs 364, 366 respectively, above and below the slide 460 and in front of the upturned end 462 of said slide. When the arm 184 is moved to draw back the awl carrier 168 as the machine is rendered inoperative, the lugs 364 and 366 engage the upturned end 462 of the slide 460 and draw said slide back against the tension of its spring 464. As the machine is rendered operative to insert fastenings, after the work has been presented in fastening receiving position, the arm 184 moves forward under the action of the cam groove 192 in the cam disk 194 upon a second arm 188 upon the other end of the rock-shaft 186 and the slide 460 would thus be permitted to move forward under the action of the spring 464 if at this time such forward movement were not prevented by the lever 450 which has been turned about its pivot by the presentation of the work to the machine to cause its rear end to be positioned in the path of movement of the slide 460. The slide 460 is thus prevented from moving forward while the forward end of the lever 450 is in engagement with the upper face of the work.

It will be noted from an inspection of Figs. 2, 3 and 4 of the drawings that the forward end of the lever 450 will be in engagement with the upper face of the work which, in these figures, is shown as the heel of a shoe, until the row of successively inserted fastenings has reached a point near the other breast corner of the heel. As the row of fastenings approaches this other breast corner of the heel, the forward end of the lever 450 will drop over the breast edge, being pressed by the spring 456 into such a position that its rear end moves out of engagement with the forward end of the slide 460, and the slide will thereby be permitted to move forward under the action of the spring 464 to turn the bell crank to break the toggle 322, 324 and stop the insertion of fastenings. It will be noted that the spacing of the work engaging end of the lever 450 from the point at which the fastenings are inserted may be so determined as to give the desired spacing of the last fastening to be inserted from the breast edge of the heel. As the machine starts to insert fastenings the end gage 352 is drawn back out of the path of movement of the arm by the engagement of the lug 366 with a pin 378 on a lever 374 pivoted at 372 upon the support 354, said lever carrying at its other end a pin 376 which enters a lateral recess or slot in the rear end of the gage bar 352. A spring 360 serves to move the gage 352 back into its operative position.

The casing or support 354 is held in its operative relation to the machine by a spring bolt 468 which engages a notch in a lug 470 depending from the machine head, said bolt being provided with a knurled hand piece 472. A pin 474 guided in a slot 476 in the casing or support 354 keeps the bolt 468 from turning.

It will be noted that the forward end of the lever 450 is normally pressed by the spring 456 into such position that this end of the lever will serve as an end gage for determining the position of the last fastening to be inserted with respect to the breast edge of the heel when the machine is being employed to do what is termed "quarter slugging."

An advantage of the illustrated construction is that the force through which the automatic stopping mechanism is operated is not transmitted to the work and that moreover the pressure of the work engaging member 450 upon the work is in such a direction that it does not oppose the efforts of the operator in maintaining the work against the edge gage 350. It will thus be seen that an important feature of the invention is the provision of means for automatically stopping the insertion of fastenings at a predetermined point upon the work, controlled in its operation by the change in contour of the work at another determined point, which does not transmit to the work the force by which the stopping is effected.

A further important feature of the invention is the provision of a work engaging member for controlling the operation of the aforementioned means in accordance with a change in contour of the work which is pressed upon the work in such a direction that it does not interfere with the maintenance of the work in proper operative relation to the gage or gages by which its direction of movement is determined.

Having described my invention, what I claim as new and desire to secure by Letters Patent of the United States is:—

1. A machine of the class described, having in combination, mechanism for performing successive operations at different locations upon work which is moved between the successive operations into different relations thereto, means independent of the work to be operated upon for rendering said mechanism operative, other means tending to render said mechanism inoperative, and means for preventing the operation of said other means moved into operative position by engagement with that face of the work which is to be operated upon as the work is presented to the machine.

2. A machine of the class described, having in combination, mechanism for performing successive operations at different locations upon work which is moved between the successive operations into different relations thereto, manually controlled means for rendering said mechanism operative, other means arranged to operate through said first-named means and tending normally to render said mechanism inoperative and means for preventing the operation of said last-mentioned means comprising a work engaging member arranged to bear upon that face of the work which is to be operated upon and having operative movement in a direction normal to said face.

3. In a machine of the class described, mechanism for successively inserting fastenings into the face of work which is moved between the successive inserting operations into different relations thereto, means for positioning the face of the work with respect to the inserting mechanism before said mechanism is rendered operative to insert fastenings, means tending normally to interrupt the insertion of fastenings, and means for preventing the operation of said last-mentioned means rendered operative by the movement of the work into operative relation to said positioning means.

4. In a machine of the class described, mechanism for inserting fastenings, means for positioning the fastening receiving face of the work with respect to said mechanism before said mechanism is rendered operative to insert fastenings, means tending normally to interrupt the insertion of fastenings, and means for preventing the operation of said last-mentioned means rendered operative by the engagement therewith of the fastening receiving face of the work as it is moved into operative relation to said positioning means.

5. In a machine of the class described, mechanism for inserting fastenings, manually controlled means for rendering said mechanism operative, other means tending to stop the insertion of fastenings after said mechanism has been rendered operative, and means for preventing the operation of said stopping means comprising a member arranged to engage the fastening receiving face of the work and movable from operative to inoperative position in a direction substantially normal to said face.

6. In a machine of the class described, fastening inserting mechanism, manually controlled means for rendering said mechanism operative, other means tending normally to stop the insertion of fastenings after said mechanism has been rendered operative, and means for preventing the operation of said stopping means before the work has been brought into a predetermined relation to said mechanism comprising a member maintained in operative position by engagement with the fastening receiving face of the work and movable from operative to inoperative position in a direction substantially normal to said face.

7. In a machine of the class described, fastening inserting mechanism, means independent of the work for rendering said mechanism operative to insert fastenings, means tending normally to interrupt the insertion of fastenings after said fastening inserting mechanism has been rendered operative, and means for preventing the operation of said interrupting means comprising a work engaging member movable from operative to inoperative position in a direction substantially normal to the fastening receiving face of the work.

8. In a machine of the class described, mechanism for successively inserting fastenings, means tending normally to stop the insertion of fastenings having operative movement in substantially the plane of the fastening receiving face of the work, and means for preventing the operation of said stopping means maintained in operative position by engagement with the face of the work when said work is in fastening receiving position, said last-mentioned means having operative movement in a direction substantially normal to the face of the work.

9. In a machine of the class described, mechanism for inserting fastenings, means independent of the work for rendering said mechanism operative to insert fastenings, means tending normally to interrupt the insertion of fastenings, and means for preventing the operation of said interrupting means comprising a work engaging member movable from operative to inoperative position in a direction substantially normal to the direction of movement of said interrupting means.

10. In a machine of the class described, mechanism for successively inserting fastenings, means independent of the work for rendering said mechanism operative to insert fastenings, means tending normally to stop the insertion of fastenings and means moved into the path of movement of said stopping means by the presentation of the fastening receiving face of the work to the inserting mechanism for preventing the operation of the stopping means until the work has been brought into a predetermined relation to the inserting mechanism.

11. A machine of the class described, having in combination, mechanism for successively inserting fastenings into work moved past said mechanism, means for providing a three-dimensional location of the work to receive the initial fastening, means for rendering said mechanism operative to insert fastenings, means associated with said last-named means for moving out of the path of movement of the work that part of the locating means which extends into said path, and means comprising a work engaging member having its operative movement in a plane substantially normal to the plane of movement of said part of the locating means, for automatically rendering said mechanism inoperative when the work has been brought into a predetermined relation thereto.

12. In a machine of the class described, mechanism for successively inserting fastenings into work moved past said mechanism, an edge gage for guiding the work to form a row of fastenings and means for automatically stopping the insertion of fastenings when the work has been brought into a predetermined relation to the inserting mechanism comprising a work engaging member arranged to bear upon the fastening receiving face of the work at a point upon the other side of the row of fastenings with respect to the edge gage and controlled in its operation by the movement of an edge of said face past said member.

13. A machine of the class described, having in combination, mechanism for performing successive operations at different locations upon the face of work which is moved between the successive operations into different relations thereto, means for determining the operative relation of the fact of the work to said mechanism, and means for automatically rendering said mechanism inoperative after the work has been brought into a predetermined relation thereto comprising a member arranged to engage the face of the work at a point removed from the point of operation of said mechanism upon said face and out of the line of successive points of operation, said member having operative movement in a plane substantially normal to said face.

14. In a machine of the class described, mechanism for inserting fastenings, manually controlled means for rendering said mechanism operative, means brought into operative condition as said mechanism is rendered operative which tends normally to interrupt the insertion of fastenings, and means for preventing the operation of said interrupting means comprising a work engaging member moved into operative position by the presentation of the work to the machine in advance of the actuation of the manually controlled starting means.

15. In a machine of the class described, automatic means for rendering the machine inoperative when the work has been brought into a predetermined relation thereto after a number of successive operations upon the work comprising a member positively held in inoperative position when the machine is stopped and yieldingly impelled in the direction of its operative movement as the machine is started, and means interposed in the path of movement of said member in advance of the starting of the machine constructed to prevent the operative movement of the said member until the work has been brought into a predetermined relation to said last-mentioned means.

16. In a machine of the class described, mechanism for inserting fastenings, means comprising a toggle for rendering said mechanism operative, means for breaking said toggle to render said mechanism inoperative comprising a spring-impelled slide and a catch for holding said slide against movement in the operative direction maintained in operative position by engagement with the work.

17. In a machine of the class described, mechanism for inserting fastenings, means comprising a toggle for rendering said mechanism operative, means for breaking said toggle to render said mechanism inoperative comprising a spring-impelled slide and a catch for holding said slide against movement in the operative direction maintained in operative position by engagement with the work, said catch being permitted to move into inoperative position by predetermined change in the contour of the work.

18. In a machine of the class described, mechanism for inserting fastenings, means for rendering said mechanism operative, other means for automatically rendering said mechanism inoperative when the work has been brought into a predetermined relation thereto comprising a spring-operated slide and a spring-operated catch for holding said slide against movement in the operative direction maintained in operative position by engagement with the fastening receiving face of the work.

19. In a machine of the class described, fastening inserting mechanism, means for automatically stopping the insertion of fastenings at a predetermined point upon the work controlled in its operation by the change in contour of the work at another determined point, said means being constructed and arranged to prevent the transmission to the work of the force by which it is operated.

20. In a machine of the class described, mechanism for inserting fastenings, means for rendering said mechanism operative, other means for automatically rendering said mechanism inoperative when the work has been brought into a predetermined relation thereto comprising a spring-operated slide and a spring-operated catch for holding said slide against movement in the operative direction maintained in operative position by engagement with the work, the direction of movement of said catch being so related to the direction of movement of said slide that the work is subjected to pressure from the catch operating spring only.

21. A machine of the class described, having in combination, mechanism for performing successive operations at different locations upon work which is moved between the successive operations into different relations thereto, means for rendering said mechanism operative and other means for automatically rendering said mechanism inoperative when the work has been brought into a predetermined relation thereto comprising a spring-impelled slide, a spring-impelled catch for holding said slide against movement in the operative direction maintained in operative position by engagement with the work, the directions of movement of said slide and catch being so related to each other that the work is subjected to pressure from the catch impelling spring only.

22. A machine of the class described, having in combination, fastening inserting mechanism, means independent of the work for rendering said mechanism operative to insert fastenings and means for automatically stopping the insertion of fastenings at a predetermined point upon the work controlled in its operation by the change in contour of the work at another determined point, said means comprising a member arranged to engage the fastening receiving face of the work and controlled in its operation by the movement of an edge of said face past said member.

23. In a machine of the class described, mechanism for successively inserting fastenings into work moved past said mechanism, means independent of the work for rendering said mechanism operative to insert fastenings and means for automatically stopping the insertion of fastenings when the work has been brought into a predetermined relation to the inserting mechanism comprising a work engaging member arranged to bear upon the fastening receiving face of the work and controlled in its operation by the movement of an edge of said face past said member.

24. In a machine of the class described, mechanism for successively inserting fastenings into work moved past said mechanism, means independent of the work for rendering said mechanism operative to insert fastenings, means for automatically stopping the insertion of fastenings when the work has been brought into a predetermined relation to said mechanism comprising a work engaging member arranged to bear upon the fastening receiving face of the work at a point more remote from the edge of the work than the row of successively inserted fastenings, said member being controlled in its operation by the movement of an end of said face past said member.

25. In a machine of the class described, mechanism for successively inserting fastenings into the tread face of a heel along its side and back edges, means independent of the work for rendering said mechanism operative to insert fastenings and means for automatically stopping the insertion of fastenings as the row of successively inserted fastenings approaches the breast edge of the heel comprising a work engaging member controlled in its operation by the movement of said breast edge beneath it, said member being arranged to engage the tread face of the heel at a point more remote from the edge of the heel than the row of fastenings.

26. In a machine of the class described, mechanism for successively inserting fastenings into work moved past said mechanism, means independent of the work for rendering said mechanism operative to insert fastenings and means for automatically stopping the insertion of fastenings when the work has been brought into a predetermined relation to the inserting mechanism comprising a work engaging member arranged to bear upon the fastening receiving face of the work and yieldingly pressed in a direction normal to said face whereby it is permitted to operate as an edge of said face moves past said member.

27. In a machine of the class described, the combination with mechanism for successively inserting fastenings into work moved past said mechanism, of means for automatically stopping the insertion of fastenings at a predetermined distance from the end of the work comprising a work engaging member arranged to engage the fastening receiving face of the work, said member having operative movement in a direction substantially normal to said face and being so located with respect to the inserting mechanism that the end of the work passes said member as the row of successively inserted fastenings approaches said end.

In testimony whereof I have signed my name to this specification in the presence of two subscribing witnesses.

LOUIS A. CASGRAIN.

Witnesses:
H. DORSEY SPENCER,
JAMES R. HODDER.